No. 876,114. PATENTED JAN. 7, 1908.
W. W. VOSPER.
TAPER THREAD CUTTING MACHINE.
APPLICATION FILED SEPT. 23, 1907.

WITNESSES.
Hazel B. Hiett
Powell Schreiber

INVENTOR.
William W. Vosper,
By Owen & Owen,
his attys.

UNITED STATES PATENT OFFICE.

WILLIAM W. VOSPER, OF TOLEDO, OHIO.

TAPER-THREAD-CUTTING MACHINE.

No. 876,114.　　　Specification of Letters Patent.　　Patented Jan. 7, 1908.

Application filed September 23, 1907. Serial No. 394,076.

*To all whom it may concern:*

Be it known that I, WILLIAM W. VOSPER, a citizen of the United States, and resident of Toledo, in the county of Lucas and State of Ohio, have invented a certain new and useful Taper-Thread-Cutting Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines for use in cutting screw-threads on metallic pipes or other cylindrical objects, and particularly to that class of apparatus designed for the cutting of taper threads and which have a guide-part to hold the work and a head movable relative thereto and carrying a series of radially-movable dies or chasers for cutting the threads.

The primary object of my invention is the provision of a simple, cheap and highly efficient machine of this class, which is capable of being easily and quickly adjusted to adapt it to cut threads on several different sizes of pipe without changing the dies or chasers thereof.

The operation, construction and arrangement of the parts of the invention are fully described in the following specification, and a preferred embodiment thereof illustrated in the accompanying drawings, in which,—

Figure 1:
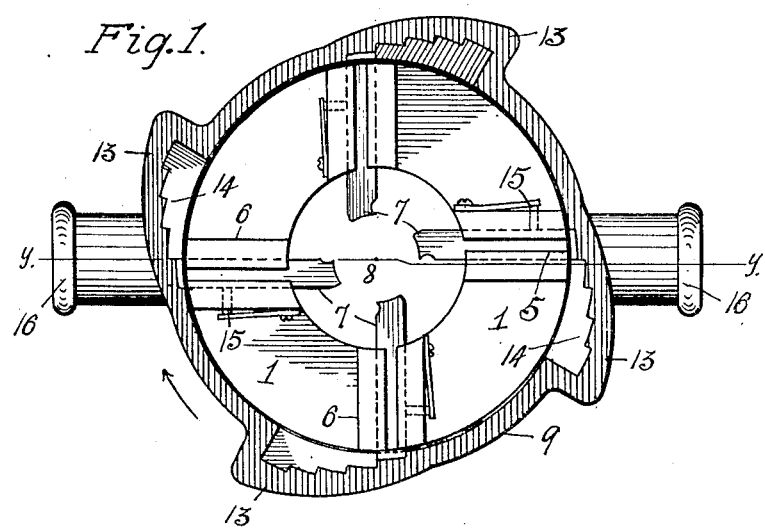
Figure 2:
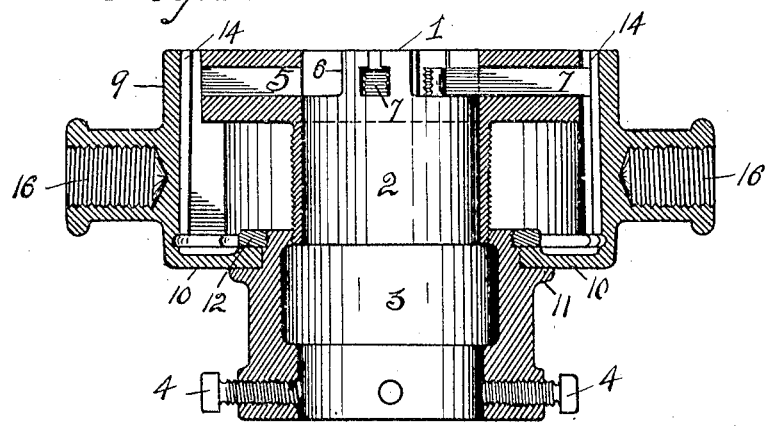

Figure 1 is a top plan view of the face or die-carrying end of the machine comprising my invention, and Fig. 2 is a central longitudinal section of the same taken on the line *y y* in Fig. 1.

Referring to the drawings, 1 designates a circular die-head having the cylindrical extension 2, which is threaded to form the lead screws of the machine, and 3 the cylindrical guide or work-holder, which is threaded to the cylindrical extension 2, as shown, and carries a set of set-screws 4 for clamping the guide to the work.

The die-head 1 is provided on its face with a plurality of radial chaser-ways 5, preferably formed in bosses or raised portions 6 of the head, as shown, and in each of these ways is mounted a radially-movable chaser or die 7, the inner end of which is intended to project within the central work-opening 8 of the head.

Encircling the die-head 1 is a cylindrical casing 9 having its lower or inner end terminating in an inturned annular flange 10, which is rotatably supported upon a flange 11 on the guide 3 and is prevented from longitudinal movement relative to the guide by the threading of a collar 12 to the end of the guide above the flange 11. The casing 9 is thickened at points falling opposite the chasers 7, as at 13, and these thickened portions are each formed on their inner surfaces with a series of graduated steps 14 arranged circularly of the casing and intended to form seats against which the chasers have their outward radial thrusts when cutting a thread. The steps 14 extend longitudinally of the casing and each is tapered lengthwise thereof to cause the chasers having contact therewith to have a gradual radial movement when the die-head and guide have relative longitudinal movements. The chasers are yieldingly retained in their run-ways by the coaction therewith of spring-pressed pins 15. Formed in direct opposition on the outer side of the casing 12 are two sockets 16 into which the ends of handles may be secured to facilitate a turning of the casing.

In the operation of my device, the chasers are first adjusted so that their rear ends abut the steps 14 suited to the size of the pipe or other object to be threaded, and the work is then passed into the guide and secured by the set-screws 4. As the casing is turned in the proper direction to cut a thread the shoulders of the steps 14 engaged by the chasers act on the sides of the chasers and cause the die-head to turn therewith. As the die-head works into its guide due to the action of the lead-threads, the outer chaser ends move longitudinally of the inclined surfaces of the engaged steps and cause the chasers to have radial movements to cut the threads on a taper in accord with the degree of inclination of such surfaces.

It is apparent that I have provided a cheap and simple taper-thread cutting machine, the chasers of which may be readily and easily adjusted to operate on several different sizes of work by simply turning the casing relative to the die-head until the chasers radially register with the desired steps 14 and then moving the chaser in abutment therewith, thus obviating the replacing of parts or the manipulation of adjusting screws, which the constructions heretofore used have made necessary to adjust the chasers.

Having thus described my invention, what I claim as new and desire to secure by Letters Patent, is,—

1. In a screw thread-cutting apparatus, the combination with the die-head and work-guide in screw-threaded engagement with each other, of chasers radially movable in the head, and a member rotatably carried by the work-guide and having chaser-engaging surfaces which are stepped in transverse relation to the member and inclined longitudinally of the head.

2. The combination with the die-head and the guide threaded thereto, of radially-movable chasers carried by the die-head, and means rotatably carried by the guide and having a set of chaser-engaging steps for each chaser, the steps of each set running circularly of the die-head and having their surfaces longitudinally inclined to effect a radial movement of the chasers when the die-head and guide have relative longitudinal movements, said means being adapted to turn with the head due to the engagement of the chaser ends with the steps.

3. The combination with the die-head, and the guide to which it is threaded, of radially-movable chasers carried by the die-head with their outer ends protruding therefrom, a casing encircling the die-head and having its inner end contracted and journaled on the guide, said casing having stepped surfaces associated with each chaser, the steps of which are circularly arranged and longitudinally inclined to cause the coacting chasers to move radially when the die-head and guide have relative longitudinal movements.

4. The combination of a work-holder, a die-head rotatably and longitudinally movable upon the work-holder, radially-movable chasers carried by the die-head, a casing rotatably carried by the work-holder and forming a cup-like member for receiving the die-head, said casing having its wall thickened opposite each chaser and such thickened portions formed interiorly of the casing with series of steps arranged circularly thereof and being longitudinally inclined to cause the chasers coacting therewith to have radial movements when the die-head and work-holder have relative longitudinal movements.

In testimony whereof I have hereunto signed my name to this specification in the presence of two subscribing witnesses.

WILLIAM W. VOSPER.

Witnesses:
WILBER A. OWEN,
CORNELL SCHREIBER.